United States Patent
Uehara

(10) Patent No.: US 6,229,474 B1
(45) Date of Patent: May 8, 2001

(54) RADAR APPARATUS

(75) Inventor: Naohisa Uehara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/408,561

(22) Filed: Sep. 30, 1999

(30) Foreign Application Priority Data

May 28, 1999 (JP) .................................................. 11-149322

(51) Int. Cl.[7] ............................. G01S 13/93; G01S 13/42
(52) U.S. Cl. ..................... 342/70; 342/109; 342/111; 342/194; 342/196
(58) Field of Search ..................... 342/70, 71, 72, 342/98, 99, 107, 109, 111, 114, 115, 135, 152, 192, 194, 196

(56) References Cited

U.S. PATENT DOCUMENTS

| | | | |
|---|---|---|---|
| 5,517,196 | * | 5/1996 | Pakett et al. ............................ 342/70 |
| 5,929,802 | * | 7/1999 | Russell et al. ......................... 342/70 |
| 5,959,570 | * | 9/1999 | Russell et al. ......................... 342/70 |
| 6,107,956 | * | 8/2000 | Russell et al. ......................... 342/70 |
| 6,121,917 | * | 9/2000 | Yamada ................................ 342/128 |

OTHER PUBLICATIONS

"Monopulse Doppler radar for vehicle applications", Woll, J.D., Intelligent Vehicles '95 Symposium., Proceedings of the , 1995, pp.: 42–47.*

* cited by examiner

Primary Examiner—John B Sotomayor
(74) Attorney, Agent, or Firm—Sughrue, Mion, Zinn, Macpeak & Seas, PLLC

(57) ABSTRACT

A radar apparatus is comprised of; transmitting means for outputting a transmission electromagnetic wave; receiving means for IQ-phase-detecting a reception electromagnetic wave received when a transmission electromagnetic wave is reflected from a target object and returned from the target object; signal converting means for FFT-processing an output signal of the receiving means; and signal processing means in which if there are one pair of spectrums having positive and negative peak values of amplitude levels, while absolute values of frequencies thereof are identical to each other, among the data converted by this signal converting means, then it is so judged that such a spectrum having a large peak value of an amplitude level is a true spectrum, and both a distance and a relative speed between the target object and the radar apparatus are calculated by employing the frequency of the judged true spectrum.

10 Cla'ims, 5 Drawing Sheets

FFT RESULT ACQUIRED WHEN
ONE-CHANNEL SIGNAL IS SATURATED

RADAR APPARATUS

BACKGROUND OF THE INVENTION

The present invention relates to a radar apparatus mounted on a vehicle such as an automobile, and used to constitute, for instance, a vehicle-to-vehicle safety distance warning system. More specifically, the present invention is directed to such a radar apparatus capable of avoiding an occurrence of an artifact (false image), and also increasing of calculation time as to a distance and a relative speed.

As this sort of radar apparatus, an FMCW radar apparatus is known. That is, since a transmitting/receiving common antenna is employed, a compact FMCW radar apparatus can be constructed and thus, can be easily mounted on an automobile. FIG. 5 is a block diagram for representing an arrangement of a conventional on-vehicle radar apparatus. In FIG. 5, reference numeral 1 indicates an oscillator, reference numeral 2 shows a power divider, reference numeral 3 represents a transmitter amplifier, and reference numeral 4 denotes a circulator. Also, reference numeral 5 indicates a transmitting/receiving common antenna, and this antenna is arranged by an electromagnetic radiator 51 and a reflection mirror 52. Furthermore, reference numeral 6 indicates a target object, reference numeral 7 indicates a receiver amplifier, reference numeral 8 represents an IQ detecting mixer, reference numeral 9 shows a filter, and reference numeral 10 indicates an AGC amplifier. Further, reference numeral 11 represents an A/D converter, reference numeral 12 shows a signal processing apparatus, reference numeral 13 indicates an antenna scanning motor, and reference numeral 14 represents an handle angle sensor.

Next, operations of the conventional radar apparatus with employment of the above-described arrangement will now be explained. The signal processing apparatus 12 outputs a linear voltage signal for an FM modulation. In response to this FM-modulating voltage signal, the oscillator 1 produces an FM-modulated electromagnetic wave. This electromagnetic wave is divided into two wave portions by the power divider 2. One divided electromagnetic wave portion is entered into the IQ detecting mixer 8. After the other divided electromagnetic wave portion is amplified by the transmitter amplifier 3, the amplified electromagnetic wave portions radiated via the circulator 4 from the transmitting/receiving common antenna 5 to the space. The electromagnetic wave which is radiated as a transmission electromagnetic wave from the transmitting/receiving common antenna 5 to the space is reflected from the target object 6, and then is entered into the transmitting/receiving common antenna 5 as a reception electromagnetic wave having a delay time "Td" with respect to the transmission when the target object 6 owns a relative speed, the reception electromagnetic wave having a Doppler shift "fd" with respect to the transmission electromagnetic wave is inputted to the transmitting/receiving common antenna 5. After the electromagnetic wave received by the transmitting/receiving common antenna 5 is amplified by the receiver amplifier 7, the amplified electromagnetic wave is mixed with the electromagnetic wave produced from the oscillator 1 by the IQ detecting mixer 8, so that a beat signal corresponding to both the delay time "Td" and the Doppler shift "fd" is outputted. The resulting beat signal is filtered by the filter 9, and the filtered signal is amplified by the AGC amplifier 10, and thereafter, the amplified signal is entered into the A/D converter 11. Based upon the A/D-converted beat signal, the signal processing apparatus 12 calculates a distance measured from the target object 6 and a relative speed.

Next, a description will now be made of a method for calculating a distance and a relative speed. FIG. 6 is an explanatory diagram for explaining an example of a method for calculating a distance and a relative speed by a conventional on-vehicle radar apparatus. In FIG. 6, a transmission electromagnetic wave is FM-modulated by a frequency sweeping bandwidth "B" and a modulation period "Tm". A reception electromagnetic wave owns delay time "Td" defined by such that the transmission electromagnetic wave is reflected from a target object 6 located at a distance "R" and then the reflected transmission electromagnetic wave is entered into the transmitting/receiving antenna 5. Also, when the target object 6 owns a relative speed "V", a reception electromagnetic wave is Doppler-shifted by "fd" with respect to a transmission electromagnetic wave. At this time, both a frequency difference "Fbu" between a transmission signal and a reception signal when a frequency is increased, and another frequency difference "Fbd" between a transmission signal and a reception signal when a frequency is decreased are outputted as a beat signal from an IQ detecting mixer 8. This beat signal is acquired via an A/D converter 11 into a signal processing apparatus as data. This acquired beat signal is processed by way of the FFT (Fast Fourier Transform) so as to obtain the frequency differences "Fbu" and "Fbd", and also a peak value "M" of amplitude levels thereof, as shown in FIG. 7. It should be understood that the peak value of "M" is a value equivalent to a reception strength, and will be referred to as a "reception strength" hereinafter.

A method for obtaining the frequency differences "Fbu" and "Fbd", and also the reception strength "M" will now be summarized as follows: That is, when the FFT process operation is carried out, the amplitude signals with respect to the respective abscissa time and ordinate time can be converted into the amplitudes of the frequency components with respect to the respective abscissa frequency and ordinate frequency. In the case that the frequency difference "Fbu" and the reception strength "M" are acquired, generally speaking, such a peak point where a level of amplitude becomes a peak is found out, and an amplitude level value of this peak and a frequency value thereof are assumed as the reception strength "M" and the frequency difference "Fbu". This frequency acquisition is similarly applied to another frequency "Fbd". In general, the reception strengths of the frequency differences "Fbu" and "Fbd" are identical to each other, and become "M".

Based upon the above-described items "Fbu", "Fbd", "Tm", and "B", the light velocity "C (=3.0×10$^8$ m/s)", and a wavelength "λ" of a carrier wave (if a basic frequency of a carrier wave is defined as $f_0$=77 GHz, then a wavelength "λ" is given as λ=4.0×10$^{-3}$ m), the distance "R" and the relative speed "V" of the target object 6 are calculated by the below-mentioned formulae (1) and (2):

$$R = (TmC/4B) \times (Fbu + Fbd) \quad (1)$$

$$V = (\lambda/4) \times (Fbu - Fbd) \quad (2)$$

Also, in the case that a plurality of target objects are located, based upon a plurality of frequency differences "Fbu" between transmission signals and reception signals when a frequency is increased, and a plurality of frequency differences "Fbd" between transmission signals and reception signals when a frequency is decreased, both "Fbu" and "Fbd" of the same object are selected. Then, the distance "R" and the relative speed "V" are obtained from the above-described formulae (1) and (2).

Next, operations of the IQ detecting mixer 8 will now be explained in detail. In FIG. 5, the electromagnetic wave produced from the oscillator 1 is distributed to the power divider 2, and is further subdivided by ½ into two electromagnetic wave portions by the power divider P/D at the input unit of the IQ detecting mixer 8, and then, these two electromagnetic wave portions are entered as LO (local) signals into mixers 81 and 82. Also, the received electromagnetic wave is amplified by the reception amplifier 7, and thereafter, the amplified electromagnetic wave is subdivided by ½ into two electromagnetic wave portions by the power divider P/D. One subdivided electromagnetic wave portion is directly entered into the mixer 81. The other subdivided electromagnetic wave portion is entered via a 90-degree signal line (¼ wavelength) to the mixer 82. In this case, a beat signal outputted from the two mixers 81 and 82 outputs an In-phase component "I" and also a Quadrature component "Q" having a phase difference of 90 degrees with respect to the In-phase component "I". The IQ components derived from these mixers 81 and 82 are sampled by the A/D converter 11. Then, the I component and the Q component are processed as a real number portion and an imaginary number portion by the complex FFT processing operation.

When the complex FFT processing operation is carried out, it is possible to judge as to whether or not the frequency component of the spectrum is equal to a positive component based upon the positive/negative value of the phase difference by 90 degrees. As indicated in FIG. 7, only one spectrum appears after the IQ components are FFT-processed. In other words, when the FFT processing operation is carried out by employing the normal mixer, one pair of spectrums whose positive/negative frequency components are inverted appear on the frequency axis, so that it is not possible to judge as to whether the frequency component is equal to a positive value or a negative value. To the contrary, when the FFT processing operation is carried out by employing the IQ detecting mixer 8, as represented in FIG. 7, since only one spectrum appears after the IQ components are FFT-processed, it is possible to judge as to whether the frequency component of the FFT-processed IQ components is equal to a positive value or a negative value. As a consequence, it is possible to decrease an artifact, or a false image which is produced by mistakenly combining the frequency difference "Fbu" with the frequency difference "Fbd" in such a case that a plurality of targets are detected by employing the IQ detecting mixer rather than using the normal mixer.

However, when the IQ detecting mixer 8 is employed, if an IQ phase error occurs between the I-channel signal and the Q-channel signal entered into the A/D converter 11, and also an unbalance amplitude value is produced between these I/Q-channel signals, then false spectrums will appear in the frequencies of the spectrums, the symbol of which are inverted, as indicated in FIG. 8. Also, the larger the degrees of the IQ phase error and the unbalance IQ amplitude values are increased, the larger the amplitude level of the false spectrum becomes. The causes of the phase error/unbalance amplitude value maybe conceivable from the correctness of the 90-degree signal path of the IQ detecting mixer 8, the balance of the power divider P/D of the IQ detecting mixer 8, the fluctuations in the conversion losses of the two mixers 81/82 employed in the IQ detecting mixer 8, the temperature characteristic of the IQ detecting mixer 8, and the multiplexing reflection. In principle, although the phase error and the unbalance amplitude value of the I, Q-channel signals caused by the above-described items may be reduced, these unbalance reasons cannot be completely solved in view of cost, and further under drive conditions of automobiles. Under such a reason, there are problems that as a result, the false spectrum appears, the artifact is produced, and further, increasing of the calculation time caused by increasing of the spectrum will occur.

SUMMARY OF THE INVENTION

The present invention has been made to solve the above-described problems, and therefore, has an object to provide a low-cost radar apparatus having high performance, capable of suppressing an occurrence of an artifact, and also capable of suppressing an increase of calculation time, while employing a signal converting means and a signal processing means, i.e., the signal converting means for converting an output signal of a receiving means for performing an IQ phase detection into data indicated by a relationship between a frequency and an amplitude level of this output signal, from which a frequency spectrum is revealed; and the signal processing means in which if there are one pair of spectrums having positive and negative peak values of amplitude levels, while absolute values of frequencies thereof are identical to each other, among the data converted by this signal converting means, then it is so judged that such a spectrum having a large peak value of an amplitude level is a true spectrum, and both a distance and a relative speed between the target object and the radar apparatus are calculated by employing the frequency of the judged true spectrum. As a consequence, even when a phase error between an I-channel signal of an IQ detecting mixer and a Q-channel signal thereof and also an unbalance amplitude value thereof happen to occur, the radar apparatus can suppress the occurrence of the artifact and increasing of the calculation time.

A radar apparatus, according to the present invention, is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and signal processing means in which if there are one pair of spectrums having positive and negative peak values of amplitude levels, while absolute values of frequencies thereof are identical to each other, among the data converted by this signal converting means, then it is so judged that such a spectrum having a large peak value of an amplitude level is a true spectrum, and both a distance and a relative speed between the target object and the radar apparatus are calculated by employing the frequency of the judged true spectrum.

Also, a radar apparatus, according to the present invention, is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and reception-system-saturation detecting means in which when there are one pair of spectrums having positive and negative peak values of amplitude levels, while absolute values of frequencies thereof are identical to each other, among the data converted by this signal converting means, if a difference between the peak values of the amplitude levels is located within a predetermined range, then it is so judged that a reception system is saturated to thereby output a reception-system-saturation detecting signal.

The radar apparatus further comprises: signal processing means in which when the reception-system-saturation detecting signal is outputted, a true spectrum is judged from a past judgment result; and both a distance and a relative speed between the target object and the radar apparatus are calculated by employing the frequency of the judged true spectrum.

Also, the radar apparatus further comprises: signal processing means in which when the reception-system-saturation detecting signal is outputted, a true spectrum is judged from a past judgment result; when no the reception-system-saturation detecting signal is outputted, it is so judged that such a spectrum having a large peak value of an amplitude level is the true spectrum, and both a distance and a relative speed between the target object and the radar apparatus are calculated by employing the frequency of the judged true spectrum.

Furthermore, the signal converting means performs FFT (Fast Fourier Transform) of an I-channel signal and a Q-channel signal, which are IQ-phase-detected, as a real number part and an imaginary number part, respectively.

In addition, in order to judge that the absolute values of the frequencies are identical to each other, a judgement width containing a predetermined margin is set.

Also, the judgement width containing the predetermined margin is selected to be on the order of +1 bin and −1 bin.

DETAILED DESCRIPTION OF THE PREFERRED EMBODIMENTS

Embodiment 1

Figure 1:
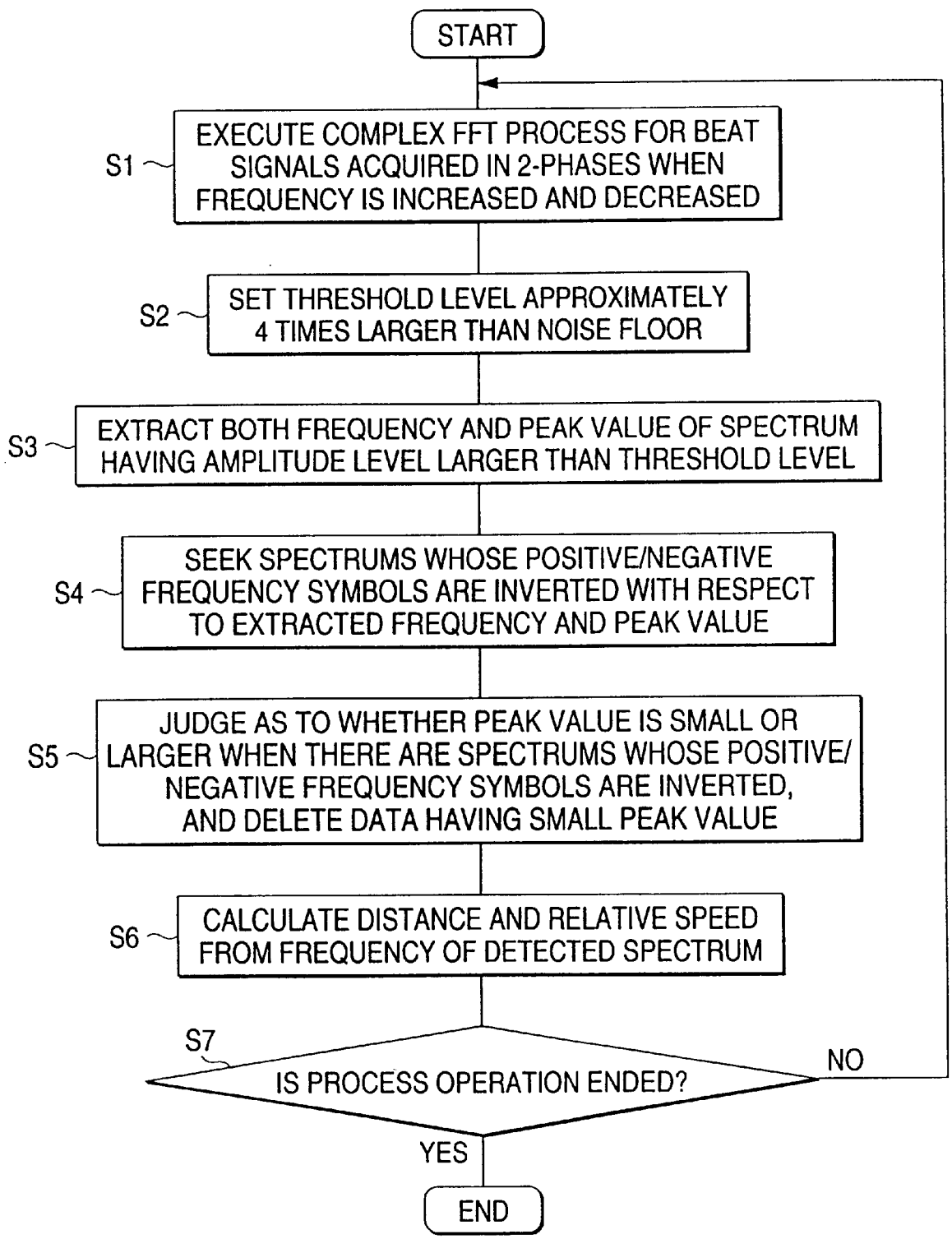
FIG. 1 is a flow chart for describing a process flow operation for calculating a distance and a relative speed by a radar apparatus according to an embodiment 1.
Figure 5:
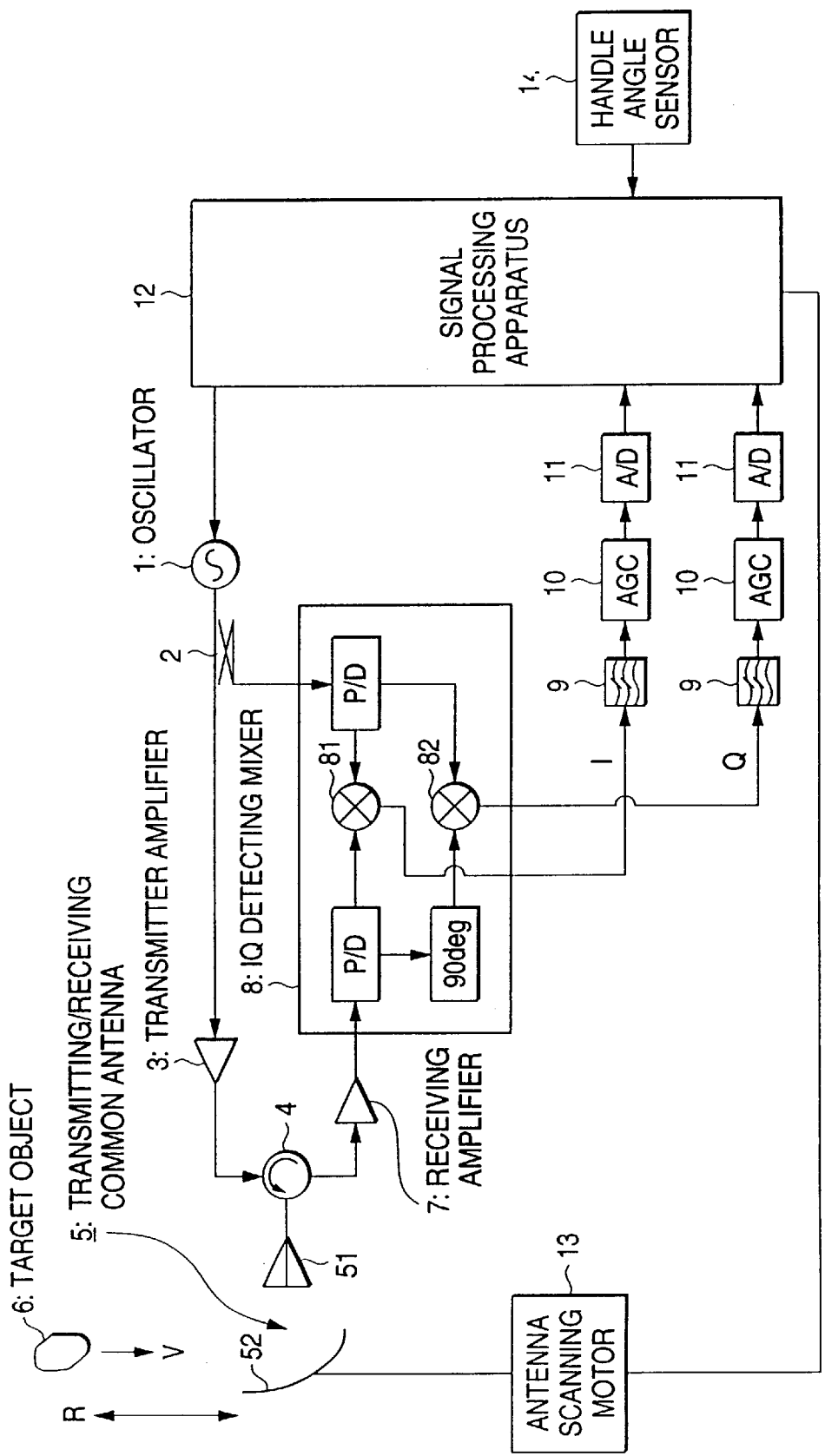
FIG. 5 is a block diagram for showing the conventional on-vehicle radar apparatus.
Figure 6:
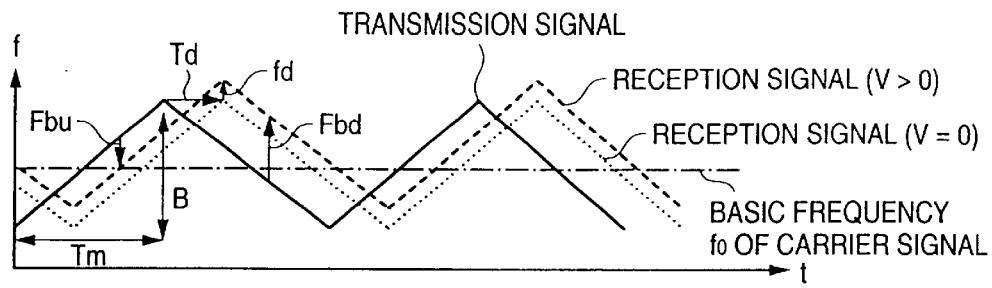
FIG. 6 is an explanatory diagram for explaining the calculation of the distance and the relative speed by the conventional on-vehicle radar apparatus.

FIG. 1 is a flow chart for representing a process flow operation for calculating a distance between a target object and a radar apparatus according to an embodiment 1, a relative speed (relative velocity). It should be noted that a diagram for showing an arrangement of the radar apparatus is the same as that of FIG. 5.

Figure 8:
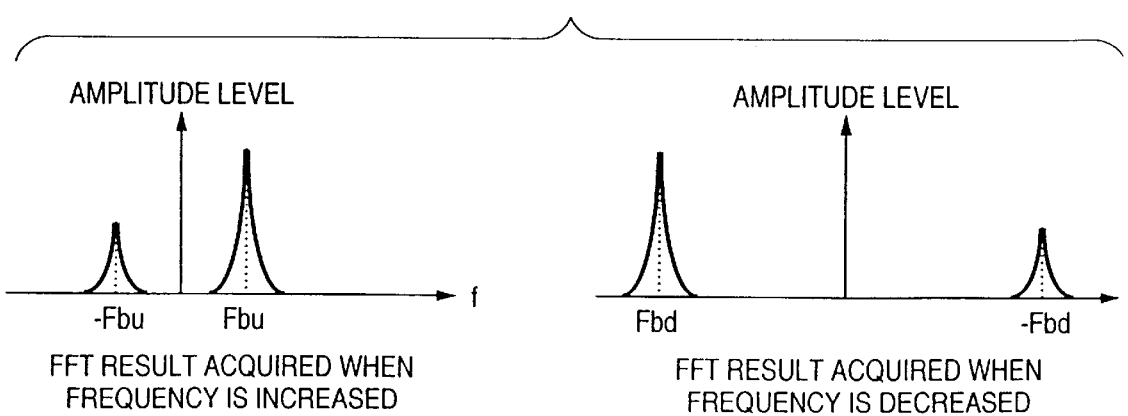
FIG. 8 is an explanatory diagram for explaining spectrums detected when an IQ balance is deteriorated.

Now, a description will be made of the embodiment 1. As previously explained, in the case that the IQ detecting mixer 8 is employed, when the unbalance amplitude of IQ occurrs and the phase difference is produced in the I-channel signal and the Q-channel signal, which are entered into the A/D converter 11, the false spectrums appear in the frequencies of the spectrums, the positive/negative symbols of which are inverted, as indicated in FIG. 8. However, spectrums of frequencies "−Fbu" and "−Fbd" corresponding to a false spectrum own smaller amplitude levels than spectrums of frequencies "Fbu" and "Fbd" corresponding to a true spectrum. The embodiment 1 is featured by considering this technical point as follows: A pair of spectrums whose positive/negative frequency symbols are inverted are found out from FFT-processed spectrums, and while a spectrum having a small amplitude level is not recognized as a true spectrum, this spectrum having the small amplitude level is not used to calculate a distance and a relative speed.

Figure 7:
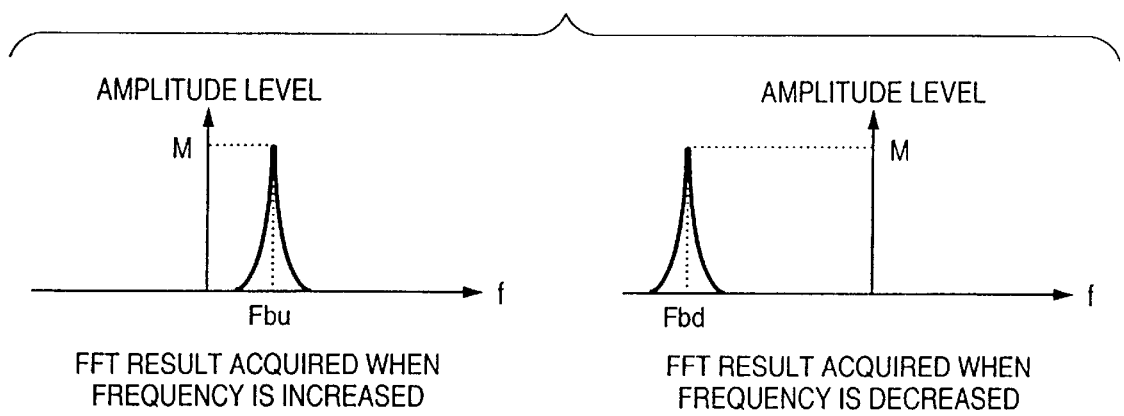
FIG. 7 is an explanatory diagram for explaining spectrums detected when a good IQ balance is achieved.

Referring now to a flow chart shown in FIG. 1, concrete operations of the radar apparatus according to the embodiment 1 will be explained. First, beat signals acquired in two phases when a frequency is increased and also a frequency is decreased are processed by way of a complex FFT (Fast Fourier Transform) process operation (will be referred to as a "step S1" hereinafter). Subsequently, as to the respective phases where the complex FFT processing operation have been carried out, a threshold level is set which is equal to approximately 4 times higher than a noise floor (step S2). It should also be noted that the noise floor corresponds to an average value of an amplitude level in a noise portion, and an abscissa shown in FIG. 7 corresponds to the level of the noise floor. Also, the threshold levels are separately set to the respective phases. Alternatively, since the noise level is equal to each other even in any phases, an average value of these separately set noise levels is calculated. Then, the averaged noise level may be used as the noise floor. Furthermore, the threshold level is set to be approximately 4 times higher than the noise floor in this embodiment. Alternatively, this threshold level may be varied in correspondence with a radar specification. Alternatively, a threshold level may be determined by performing the CFAR (constant false alarm rate) processing operation.

Next, a noise component is removed by extracting both a frequency of a spectrum and a peak value of an amplitude level higher than the threshold level (step S3). Then, a pair of spectrums whose positive/negative frequency symbols are inverted are sought with respect to the extracted frequency and the extracted peak value (step S4). When a judgement is made as to whether or not a pair of spectrums own the inverted positive/negative frequency symbols, a judgement width containing a preselected margin may be set. Next, as to the sought pair of spectrums at the previous steps S4, the spectrum having the small peak value is erased, and the total number of spectrums extracted at the step S3 is reduced (step S5). Next, a distance, and a relative speed are calculated by way of the above-explained formulae (1) and (2) based upon the frequencies of the remaining spectrums at the previous step S5 (step S6). Thereafter, an end is judged (step S7). At the step S7, the process operation is accomplished, because the power supply is turned OFF, the distance-measuring stop instruction is issued, and a fail. If the process operation is not accomplished, then the process operation is returned to the previous step S1.

In the above-described embodiment 1, a pair of spectrums whose positive/negative frequency symbols are inverted are sought, and then it is judged that such a spectrum having a smaller amplitude level is not equal to a true spectrum. Since there is a certain possibility that the frequency is shifted by approximated 1 bin due to the linearity and temperature variations in the oscillator 1 and the complex FFT calculation, when a pair of spectrums whose positive/negative frequency symbols are inverted are sought, it is desirable to set such a judgement range having margin defined by +1 bin and −1 bin.

It should be understood that a term "bin" implies a minimum frequency slice which is determined by a total point number of FFT and also measuring time.

Also, in the embodiment 1, after the threshold level is set, a pair of spectrums are extracted. Alternatively, a peak is acquired from a complex FFT result in order to judge whether or not a frequency symbol of a spectrum is positive. Then, data about a spectrum having a small level is deleted. Thereafter, a threshold level set, and such a spectrum having a level higher than, or equal to this set threshold level may be extracted.

As previously explained, in accordance with the embodiment 1, since the false spectrum can be removed before calculating the distance and the relative speed, it is possible to avoid the occurrence of the false image, and the increase of calculating both the distance and the relative speed.

In the above-described embodiment 1, the beat signals of the two phases are processed by the complex FFT process operation when the frequency is increased and further is decreased at the step S1. This complex FFT process operation may differ, depending upon the distance-measuring method and speed-measuring method. For instance, when the frequency is increased, there is no frequency change (non-modulation). When the frequency is decreased, the beat signals of the 3 phases are processed by the complex FFT process operation. Alternatively, the complex FFT processing operations are carried out in combination with the process operation when the frequency is increased, and the process operation when the frequency is constant. At this step, the phase required for calculating the distance and the speed are FFT-processed, which is however the same as such a technical point that while a pair of spectrums whose positive/negative frequency symbols are inverted are found out from the FFT process result, a spectrum having a smaller amplitude level is not equal to the true spectrum.

Embodiment 2

Figure 2:
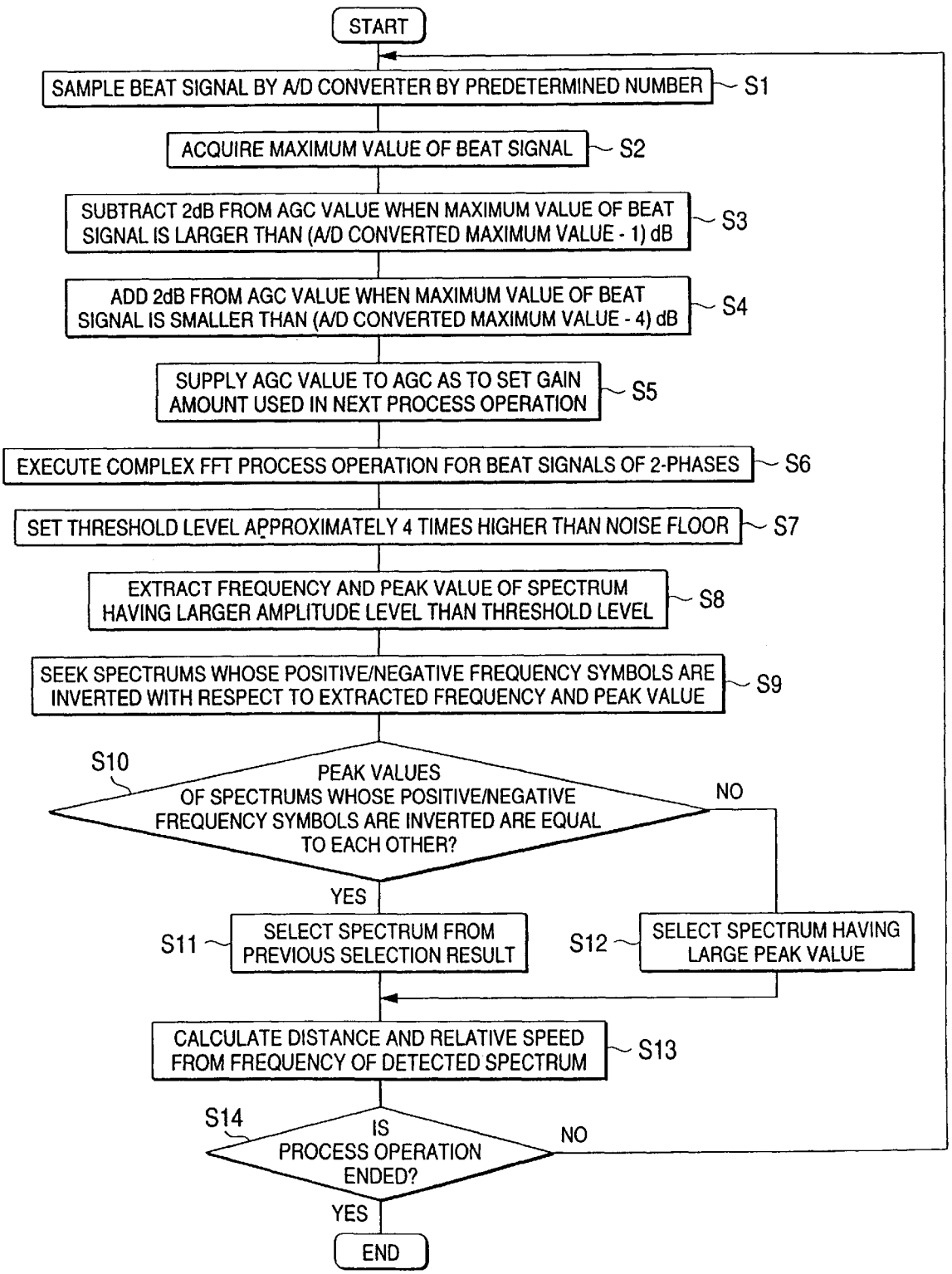
FIG. 2 is a flow chart for describing a process flow operation for calculating a distance and a relative speed by a radar apparatus according to an embodiment 2.

FIG. 2 is a flow chart for representing a process flow operation for calculating a distance between a target object and a radar apparatus according to an embodiment 2, a relative speed (relative velocity). It should be noted that a diagram for showing an arrangement of the radar apparatus is the same as that of FIG. 5.

Similar to the embodiment 1, in the case that the IQ detecting mixer 8 is employed, when the unbalance amplitude of IQ occurs and the phase difference is produced between the I-channel signal and the Q-channel signal, which are entered into the A/D converter 11, false spectrums appear in the frequencies of the spectrums, the positive/negative symbols of which are inverted, as indicated in FIG. 8. Furthermore, when any one-channel signal of the I and Q channels is saturated in the signal reception system, similar to the one-channel detection, such spectrums appear, the amplitude levels of which are equal to each other and the positive/negative frequency symbols of which are inverted. As a consequence, since such a judgement is made as to whether or not the amplitude levels of the spectrums are equal to each other though the positive/negative frequency symbols are inverted, it is possible to detect as to whether or not any one-channel signal is saturated in the signal reception system. In this case, since the amplitude levels of these spectrums are equal to each other, it is practically difficult to judge as to which spectrum corresponds to a true spectrum. As a consequence, it may be judged as to which spectrum corresponds to the true spectrum based upon the past history.

It should also be noted that such a phenomenon that the above-described spectrums, the amplitude levels of which are equal to each other and the positive/negative frequency symbols of which are inverted, appear will mainly occur in the input unit of the A/D converter. Similarly, even when the one-channel signal is saturated in any circuit portions from the reception amplifier 7 up to the handle angle sensor 11 shown in FIG. 5.

Figure 3:
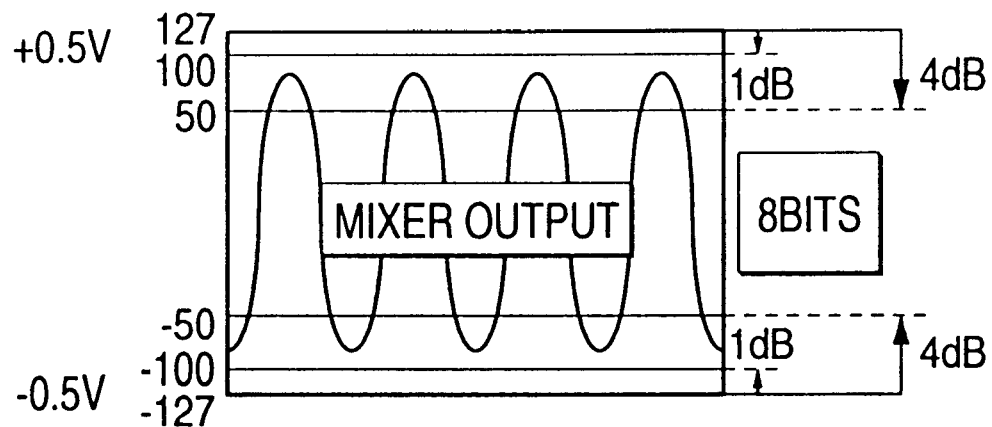
FIG. 3 is an explanatory diagram for explaining operation of AGC in the embodiment 2.
Figure 4:
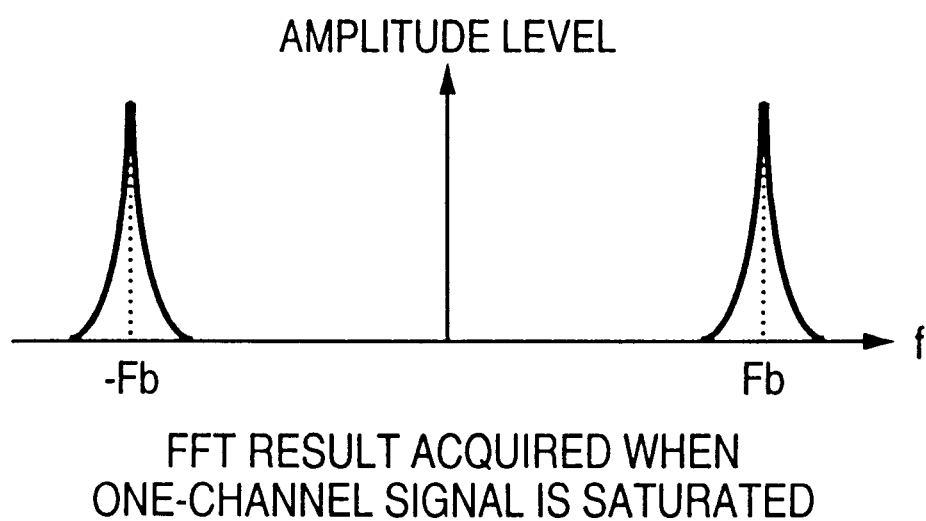
FIG. 4 is an explanatory diagram for explaining a true spectrum and a false spectrum when a signal reception system is saturated.

Referring now to a flow chart shown in FIG. 2, concrete operations of the radar apparatus of the embodiment 2 will be explained. First, beat signals acquired in two phases while the frequency is increased and also is decreased, are sampled in the A/D converter 11 by a preselected number (namely, in general, 2ⁿ) (step S1). Next, a maximum value of each of the beat signals is acquired, and an AGC amount for the next time is determined to thereby set the AGC 10 (steps S2 to S5). In this case, such an image diagram is shown in FIG. 3, by which the gain amount (Gain) of this AGC 10 is feedback-controlled and is again set. In FIG. 3, there is shown such a sampling result that the signal amplified by the AGC 10 is sampled by the A/D converter 11 in a time sequential manner. The signal processing apparatus 12 sets the gain amount of the AGC 10 in such a manner that the maximum amplitude of the amplified signal maybe always converged into a preselected range. As a typical example in this embodiment, assuming now that a maximum input value of the A/D converter 11 is selected to be 0.5 V, while a digital value is 127 and a minimum input value is −0.5 V at this time, a digital value is selected to be −127 at this time. Also, the above-described predetermined range is defined between a point (digital value of 50) located below the maximum input value by 4 dB and another point (digital value of 100) located below the maximum input value by 1 dB, while estimating a margin. The signal processing apparatus 12 performs the feedback control such that the maximum amplitude of the amplified signal may be continuously converged into this range.

Next, the beat signals acquired while the frequency is increased and also decreased in the two phases are processed by the complex FFT processing operation (step S6). Subsequently, in the respective phases where the complex FFT processing operations have been carried out, a threshold level is set which is equal to approximately 4 times higher than a noise floor (step S7). It should also be noted that the noise floor corresponds to an average value of an amplitude level in a noise portion, and an abscissa shown in FIG. 7 corresponds to the level of the noise floor. Also, the threshold levels are separately set to the respective phases. Alternatively, since the noise level is equal to each other even in any phases, an average value of these separately set noise levels is calculated. Then, the averaged noise level may be used as the noise floor. Furthermore, the threshold level is set to be approximately 4 times higher than the noise floor in this embodiment. Alternatively, this threshold level may be varied in correspondence with a radar specification. Alternatively, a threshold level may be determined by performing the CFAR processing operation. Next, a noise component is removed by extracting both a frequency of a spectrum and a peak value of an amplitude level higher than the threshold level (step S8). Then, a pair of spectrums whose positive/negative frequency symbols are inverted are sought with respect to the extracted frequency and the extracted peak value (step S9). When a judgement is made as to whether or not a pair of spectrums own the inverted positive/negative frequency symbols, a judgement width containing a preselected margin may be set. It should also be noted that the process operations defined from the step S6 to the step S9 are similar to those defined from the step S1 to the step S4 of the embodiment 1.

A judgement is made as to whether or not a peak value of each of the paired spectrums sought at the step S9 is equal to that of the remaining spectrum (step S10). When the peak values of these paired spectrums are equal to each other, another judgement is made as to which spectrum corresponds to a true spectrum based upon the previous judgement result. In other words, in such a case that it is so judged in the previous process operation that the peak value of the amplitude level owned by the spectrum whose frequency is inverted to the negative is small and this spectrum is deleted among the spectrums whose frequencies are inverted, if the frequency of the spectrum during the present process operation is identical to that of the above-explained spectrum, then such a spectrum having the negative frequency is deleted. When the process operations defined from the step S1 to the step S14 are carried out, for instance, every 100 ms, a spectrum is selected based upon the selection result acquired at the previous 100 ms (step S11). To the contrary, when the peak values of the spectrums are not equal to each other at the step S10, such a spectrum having a large peak value is selected similar to the embodiment 1 (step S12).

Next, both a distance and a relative speed are calculated based upon the frequency of the spectrum extracted at either the step S11 or the step S12 in accordance with the above-explained formulae (1) and (2). Next, a judgement is made as to whether or not the process operation is ended (step S14). It should be noted that at the step S14, the process operation is accomplished, because the power supply is turned OFF, the distance-measuring stop instruction is issued, and a fail. If the process operation is not yet ended, then the process operation is returned to the previous step S1.

At the step S6, when one-channel signal is saturated among the I-channel signal and the Q-channel signal, similar to the 1-channel detection, spectrums having the same amplitude levels, the positive/negative frequency symbols of which are inverted, appear. The reason why there is such a possibility that one channel signal is saturated although the AGC value is set is given as follows. That is to say, the data acquired in the present time causes the AGC value based upon the measurement result obtained during the previous time.

While a pair of spectrums whose positive/negative frequency symbols are inverted are sought at the step S9, since there is a certain possibility that the frequency is shifted by approximated 1 bin due to the linearity and temperature variations in the oscillator 1 and the complex FFT calculation, it is desirable to set such a judgement range having margin defined by +1 bin and −1 bin.

Also, in the embodiment 2, after the threshold level is set, a pair of spectrums are extracted. Alternatively, a peak is acquired from a complex FFT result in order to judge whether or not a frequency symbol of a spectrum is positive. Then, data about a spectrum having a small level is deleted, and thereafter, a threshold level set, and such a spectrum having a level higher than, or equal to this set threshold level may be extracted.

Furthermore, such a judgement is made at the step S10 as to whether or not the magnitudes of the peak values are equal to each other. Alternatively, another check is made as to whether or not a predetermined level difference is not secured. In other words, under the normal condition, it is apparent that the amplitude levels of the spectrums whose positive/negative frequency spectrums are inverted are sufficiently smaller than the amplitude level of the true spectrum. As a consequence, for instance, the following judgement may be established. That is, if amplitude levels of spectrums whose positive/negative frequency symbols are inverted are higher than, or equal to a half level of an amplitude level of a true spectrum, then one-channel signal is saturated.

This process operation may be summarized as follows. In other words, in such a case that there are spectrums whose frequency absolute values are equal to each other and whose frequency symbols are positive and negative, when a difference between peak values of amplitude levels thereof is located within a predetermined range, it may be judged that one-channel signal is saturated.

Also, although the previous selection result is utilized at the step S11, the relevant spectrum may be selected from the monitoring result acquired several times during the past process operations. That is, in order to increase the judgement securing characteristic, another check may be alternatively made as to which frequency symbols have been selected several times during the past process operation, so that the spectrum having the selected frequency symbol may be selected.

As previously explained, in accordance with the embodiment 2, since the false spectrum can be removed before calculating the distance and the relative speed, it is possible to avoid the occurrence of the false image, and the increase of calculating both the distance and the relative speed.

In the above-described embodiment 2, the beat signals of the two phases are processed by the complex FFT process operation when the frequency is increased and further is decreased at the step S6. This complex FFT process operation may differ, depending upon the distance-measuring method and speed-measuring method, similar to the embodiment 1. However, the below-mentioned detecting operation and true spectrum acquiring operation are the same as those of the embodiment 1. That is, since a check is made as to whether or not the amplitude levels of the spectrums whose positive/negative frequency symbols are inverted are equal to each other based on the FFT process result, it is possible to detect that one-channel signal of the IQ channels is saturated in the reception system. Also, when one-channel signal is saturated, another check is made as to which spectrum corresponds to a true spectrum based upon the past history.

As previously described, the radar apparatus of the present invention is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and signal processing means in which if there are one pair of spectrums having positive and negative peak values of amplitude levels, while absolute values of frequencies thereof are identical to each other, among the data converted by this signal converting means, then it is so judged that such a spectrum having a large peak value of an amplitude level is a true spectrum, and both a distance and a relative speed between the target object and the radar apparatus are calculated by employing the frequency of the judged true spectrum. As a consequence, the false spectrum which is caused by deteriorations in the IQ channel balance can be removed before the distance and the relative speed are calculated. Accordingly, it is possible to avoid the occurrence of the artifact, and also increasing of the calculation time for the distance and the relative speed.

Also, the radar apparatus of the present invention is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and reception-system-saturation detecting means in which when there are one pair of spectrums having positive and negative peak values of amplitude levels, while absolute values of frequencies thereof are identical to each other, among the data converted by this signal converting means, if a difference between the peak values of the amplitude levels is located within a predetermined range, then it is so judged that a reception system is saturated to thereby output a reception-system-saturation detecting signal. Both the deterioration in the IQ channel balance and also the saturation of the reception system can be detected. As a consequence, there is no risk that the miss-calculation is carried out to produce the artifact.

Furthermore, the radar apparatus is further comprised of: signal processing means in which when the reception-system-saturation detecting signal is outputted, a true spectrum is judged from a past judgment result; and both a distance and a relative speed between the target object and the radar apparatus are calculated by employing the frequency of the judged true spectrum.

Also, the radar apparatus is further comprised of: signal processing means in which when the reception-system-saturation detecting signal is outputted, a true spectrum is judged from a past judgment result; when no the reception-system-saturation detecting signal is outputted, it is so judged that such a spectrum having a large peak value of an amplitude level is the true spectrum, and both a distance and a relative speed between the target object and the radar apparatus are calculated by employing the frequency of the judged true spectrum. As a consequence, the false spectrum which is caused by deteriorations in the IQ channel balance and also the saturation of the reception system can be removed before the distance and the relative speed are calculated. Accordingly, it is possible to avoid the occurrence of the artifact, and also increasing of the calculation time for the distance and the relative speed.

Furthermore, the judgement width containing preselected margin is set in order to judge as to whether or not the absolute values of the frequencies are identical to each other. As a result, even when the various errors are produced due to the linearity and temperature changes in the oscillator and also the FFT calculation, it is possible to correctly seek a pair of spectrums whose positive/negative frequency symbols are inverted.

What is claimed is:

1. A radar apparatus comprising:

transmitting means for outputting a transmission electromagnetic wave;

receiving means for IQ-phase-detecting a reception electromagnetic wave received when the transmission electromagnetic wave is reflected from a target object and returned from the target object;

signal converting means for converting an output signal of said receiving means into data indicated by a relationship between a frequency and an amplitude level of the output signal, from which a frequency spectrum is revealed; and signal processing means in which if there are one pair of spectrums having positive and negative peak values of amplitude levels, while absolute values of frequencies thereof are identical to each other, among the data converted by said signal converting means, then it is judged that a spectrum having a large peak value of an amplitude level is a true spectrum, and both a distance and a relative speed between the target object and said radar apparatus are calculated by employing the frequency of the judged true spectrum.

2. The radar apparatus according to claim 1, wherein said signal converting means performs FFT of an I-channel signal and a Q-channel signal, which are IQ-phase-detected, as a real number part and an imaginary number part, respectively.

3. The radar apparatus according to claim 1, wherein in order to judge that the absolute values of the frequencies are identical to each other, a judgement width containing a predetermined margin is set.

4. The radar apparatus according to claim 3, wherein the judgement width containing the predetermined margin is selected to be on the order of +1 bin and −1 bin.

5. A radar apparatus comprising:

transmitting means for outputting a transmission electromagnetic wave;

receiving means for IQ-phase-detecting a reception electromagnetic wave received when the transmission electromagnetic wave is reflected from a target object and returned from the target object;

signal converting means for converting an output signal of said receiving means into data indicated by a relationship between a frequency and an amplitude level of the output signal, from which a frequency spectrum is revealed; and reception-system-saturation detecting means in which when there are one pair of spectrums having positive and negative peak values of amplitude levels, while absolute values of frequencies thereof are identical to each other, among the data converted by said signal converting means, if a difference between the peak values of the amplitude levels is located within a predetermined range, then it is judged that a reception system is saturated to output a reception-system-saturation detecting signal.

6. The radar apparatus according to claim 5, further comprising:

signal processing means in which when the reception-system-saturation detecting signal is outputted, a true spectrum is judged from a past judgment result and both a distance and a relative speed between the target object and said radar apparatus are calculated by employing the frequency of the judged true spectrum.

7. The radar apparatus according to claim 5, further comprising:

signal processing means in which when the reception-system-saturation detecting signal is outputted, a true spectrum is judged from a past judgment result; when no the reception-system-saturation detecting signal is outputted, it is judged that a spectrum having a large peak value of an amplitude level is the true spectrum, and both a distance and a relative speed between the target object and said radar apparatus are calculated by employing the frequency of the judged true spectrum.

8. The radar apparatus according to claim 1, wherein said signal converting means performs FFT of an I-channel signal and a Q-channel signal, which are IQ-phase-detected, as a real number part and an imaginary number part, respectively.

9. The radar apparatus according to claim 1, wherein in order to judge that the absolute values of the frequencies are identical to each other, a judgement width containing a predetermined margin is set.

10. The radar apparatus according to claim 9, wherein the judgement width containing the predetermined margin is selected to be on the order of +1 bin and −1 bin.

* * * * *